(12) United States Patent
Majumder

(10) Patent No.: US 7,693,818 B2
(45) Date of Patent: Apr. 6, 2010

(54) USERRANK: RANKING LINKED NODES LEVERAGING USER LOGS

(75) Inventor: Rangan Majumder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 11/274,699

(22) Filed: Nov. 15, 2005

(65) Prior Publication Data

US 2007/0112768 A1     May 17, 2007

(51) Int. Cl.
*G06F 7/00* (2006.01)
(52) U.S. Cl. .......................................... 707/2
(58) Field of Classification Search ....................... 707/2
See application file for complete search history.

(56) References Cited

U.S. PATENT DOCUMENTS

| | | | |
|---|---|---|---|
| 5,524,240 A * | 6/1996 | Barbara et al. | 707/3 |
| 6,385,641 B1 * | 5/2002 | Jiang et al. | 709/203 |
| 6,405,188 B1 * | 6/2002 | Schwartz et al. | 707/3 |
| 6,675,159 B1 * | 1/2004 | Lin et al. | 707/3 |

* cited by examiner

*Primary Examiner*—Charles Rones
*Assistant Examiner*—Fazlul Quader
(74) *Attorney, Agent, or Firm*—Workman Nydegger

(57) ABSTRACT

The claimed subject matter provides a system and/or a method that facilitates utilizing transition probability in static rankings associated with at least one document. An interface can receive data related to a query, wherein the query can be associated with a search from a user. A rank component can provide query results that are prioritized utilizing a transition probability based on user activity included within a user log.

16 Claims, 12 Drawing Sheets

USERRANK: RANKING LINKED NODES LEVERAGING USER LOGS

BACKGROUND

Technological advances in computer hardware, software and networking have lead to efficient, cost effective computing systems (e.g., desktop computers, laptops, handhelds, cell phones, servers . . . ) that can communicate with each other from essentially anywhere in the world in order to exchange information. These systems continue to evolve into more reliable, robust and user-friendly systems. As a consequence, more and more industries and consumers are purchasing computers and utilizing them as viable electronic alternatives to traditional paper and verbal media for exchanging information. For example, many industries and consumers are leveraging computing technology to improve efficiency and decrease cost through web-based (e.g., on-line) services. For instance, consumers can search and retrieve particular information (e.g., via a search engine), purchase goods, view bank statements, invoke monetary transactions (e.g., pay a bill on-line), research products and companies, apply for employment, obtain real-time stock quotes, obtain a college degree, download files and applications, transmit correspondence (e.g., email, chat rooms . . . ), etc. with the click of a mouse.

In many instances, a search engine is utilized to search for information. In general, a search engine is a special program (e.g., computer executable instructions) designed to help find files (e.g., web pages, images, text . . . ) stored on a computer, for example, a public server or on one's own personal computer. A typical search engine allows a user to invoke a query for files that satisfy particular criteria, for example, files that contain a given word or phrase in a title or body. Web search engines generally work by storing information about a large number of web pages retrieved from the World Wide Web (WWW) through a web crawler, or an automated web browser, which follows essentially every link it locates. The contents of each web page are then analyzed to determine how it should be indexed, for example, words can be extracted from the titles, headings, or special fields called meta-tags. Data about web pages is stored in an index database for use in later queries. Some search engines store (or cache) all or part of a source page as well as information about the web pages. When a user invokes a query through the web search engine by providing key words, the web search engine looks up the index and provides a listing of web pages that best-match the criteria, usually with a short summary containing the document's title and/or parts of the text. Some web search engines employ a real-time approach, wherein information is obtained when a query is started rather than obtaining stored information through indexing. With this approach, the information is more up-to-date and there typically are less dead links and less system resources are needed, but more time is generally required to complete the request.

In general, the usefulness of a search engine depends on the relevance of the results it presents to a user and the presentation of such results. While there can be numerous web pages that include a particular word or phrase, some web pages may be more relevant, popular, or authoritative than others. Most search engines employ methods to rank the results to provide a "best" result first. How a search engine decides which pages are the best matches, and what order the results should be shown in, varies widely from one engine to another. A page is ranked based on how well it fits the user's query in combination of a query independent rank of the page. The query independent rank can be based on a multitude of factors such as the number of incoming links, the site traffic, how long the site has been around or the PageRank of the page. Techniques which utilize the link structure of a graph (e.g., PageRank) usually make the incorrect assumption that all hyperlinks should be treated equally. In reality this is not true; a page links to many places because they include ads and navigational links which may not be important. In fact there are many links on a page that are never followed, and sometimes there are few links which get a majority of the click-throughs. Plus, many pages are just pages to pass through to get to another more important page.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing transition probability in static rankings associated with at least one document. A rank component can prioritize query results based at least in part upon a transition probability related to a document, wherein such transition probability is in accordance with a user activity and/or behavior identified within a user log. The rank component can receive the user log and/or query data via a user interface, wherein such data can be utilized to compute a user rank associated to the query results. The user rank can be the ranking of query results such that user activity can correlate to transition probability of documents. Thus, results for a query from a particular user can be prioritized by the rank component utilizing a transition probability in connection with various documents and user activity associated therewith. The document can be, but is not limited to, a hypertext markup language (HTML) document, a web page, a link, a hyperlink, a uniform resource locator (URL), a resource on the WWW, etc. Moreover, the user activity and/or behavior can be, but is not limited to, an amount of time on a document (e.g., a user is on document A for X minutes), a log on to a document (e.g., a log on signifies a document of interest to a user), a log off to a document (e.g., a log off signifies the document contained information located therewith and no further document is of value), a document exited (e.g., indicating the information is located on such document and no further document is of value), a document request uniform resource identifier (URI), a document referrer, etc.

In accordance with one aspect of the claimed subject matter, the rank component can employ a selector component and a filter component. The selector component can identify optimal data within a user log to be implemented to determine user activity and/or behavior. The user log can include a plurality of data, wherein at least a portion of such data can be utilized to provide the activity and/or behavior associated with a particular user. The selector component can identify at least a portion of the user log, wherein such portion can identify activity and/or behavior. The filter component can sift and/or filter the user log data in accordance with the determination of the selector component. In other words, the filter component provides the optimal data to the rank component to prioritize query results. In addition, the filter component can group data and aggregate counts associated with documents.

In accordance with another aspect of the claimed subject matter, the rank component can further employ a weight component that computes a weight distribution to provide query results while taking in account the transition probability of documents associated with user activity and/or behavior. The weight component can utilize any suitable weighting system and/or technique in order to facilitate prioritizing results in accordance to transition probability. The weight component can create a first order Markov model of a web graph from the user logs, wherein the rank of each document utilizing transition probabilities from each node to a neighboring node. The Markov model employed by the weight component can be trained on a sequence of transitions that occur such as a user that was on document X and then went to document Y afterwards by following a link from X to Y.

In accordance with another aspect of the innovation described herein, the rank component can utilize a browser. A user utilizing the browser can access and/or visit at least one document. The browser can further provide manipulation to the user log providing updates related to the documents accessed and/or visited. For instance, the user can utilize a browser to access a particular document. In another example, the browser can allow a query to be performed in relation to the Internet. Such browser can provide the query data to the rank component, wherein the rank component can provide prioritized query results in relation to transition probability to the browser. In other aspects of the claimed subject matter, methods are provided that facilitate utilizing transition probability in static rankings associated with at least one document.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
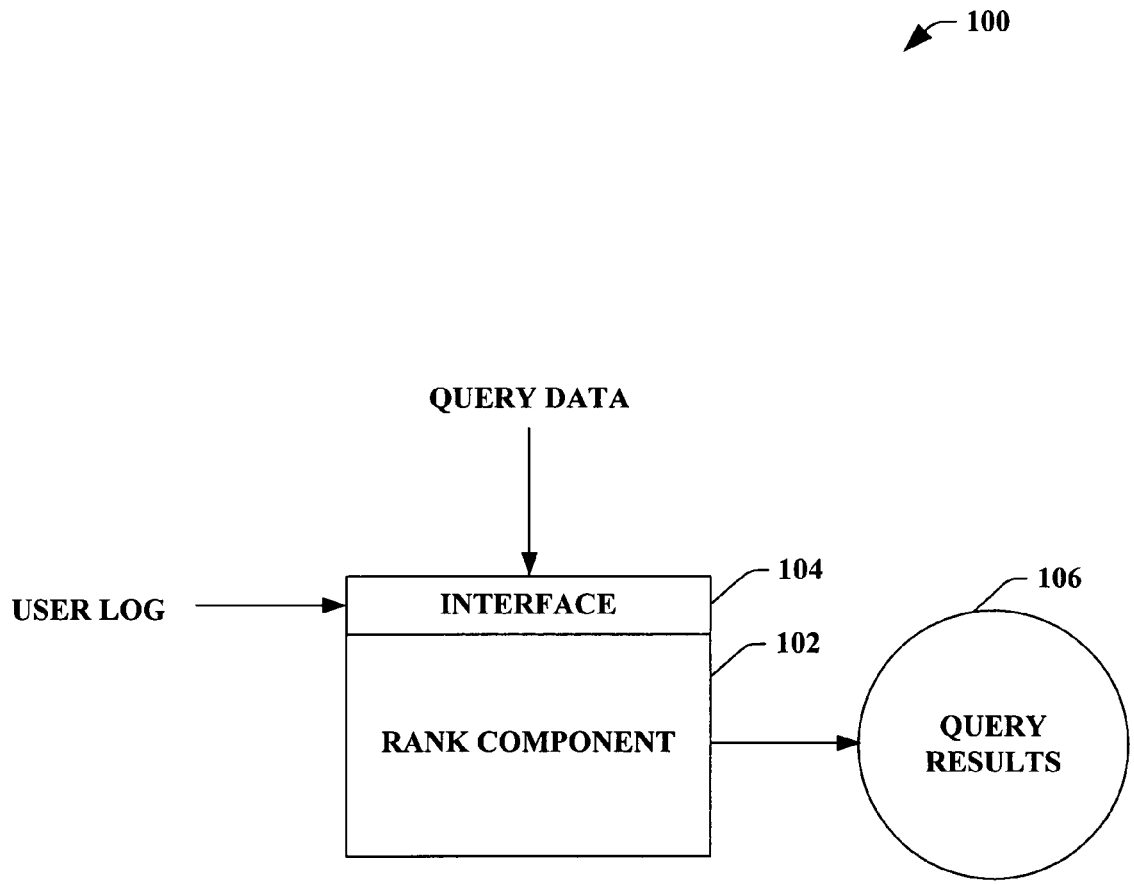
FIG. 1 illustrates a block diagram of an exemplary system that facilitates providing query results based at least in part upon user activity.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "manager," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates providing query results based at least in part upon user activity. The system 100 includes a rank component 102 that prioritizes query results 106 based at least in part upon transition probability associated with a particular user activity. An interface 104 (discussed infra) can receive at least query data, wherein query data can relate to a query from a user associated with a document. The rank component 102 can prioritize query results 106 based upon transition probability in accordance with user activity. The user activity, which can relate to the document (e.g., a hypertext markup language (HTML) document, a web page, a link, a hyperlink, a uniform resource locator (URL), a resource on the WWW, etc.), can be identified by utilizing a user log. The user log can include a plurality of data in relation to a particular user, wherein the user log allows the rank component 102 to provide prioritized query results 106 based upon document transition probability (e.g., probability that a document is to be transitioned to a disparate document and vice versa).

The rank component 102 employs transition probability of documents based upon the user behavior to account of the utility of links within such documents. In particular, the user behavior and/or activity can be, but is not limited to, an amount of time on a document (e.g., a user is on document A for X minutes), a log on to a document (e.g., a log on signifies a document of interest to a user), a log off to a document (e.g., a log off signifies the document contained information located therewith and no further document is of value), a document exited (e.g., indicating the information is located on such document and no further document is of value), a document request uniform resource identifier (URI), a document referrer, etc. The user behavior and/or activity can allow the transition probabilities for each document for each respective user to be accounted for in providing query results. Thus, the rank component 102 can be specifically implemented for a user with unique behavior and/or activity (e.g., data included within the user log)

The user activity and/or behavior can be included in the user log for each respective user. For example, a user A having activity and/or behavior related to documents a, b, and c can have a user log associated therewith; while a user B having activity and/or behavior related to documents a, b, e, g, and h can have a disparate user log associated therewith. In one example, the rank component 102 can utilize an Internet information server (IIS) user log to identify user activity and/or behavior for a particular user. Yet, it is to be appreciated and understood that the rank component 102 can utilize any suitable user log that include data that can identify user activity and/or behavior. For example, a user log can be uniquely customized (e.g., defining length of time on a document, ignoring visits to documents, etc.) to allow the rank component 102 to more accurately prioritize query results 106 based on transition probability and user activity and/or behavior. However, it is to be appreciated that the user log need not be customized since the user log includes information allowing the rank component 102 to provide query results 106.

Moreover, the system 100 can include any suitable and/or necessary interface component 104 (herein referred to as "interface 104"), which provides various adapters, connectors, channels, communication paths, etc. to integrate the rank component 102 into virtually any operating and/or database system(s). In addition, the interface 104 can provide various adapters, connectors, channels, communication paths, etc., that provide for interaction with the rank component 102, query data, user logs, and any other data, device and/or component associated with the system 100.

Figure 2:
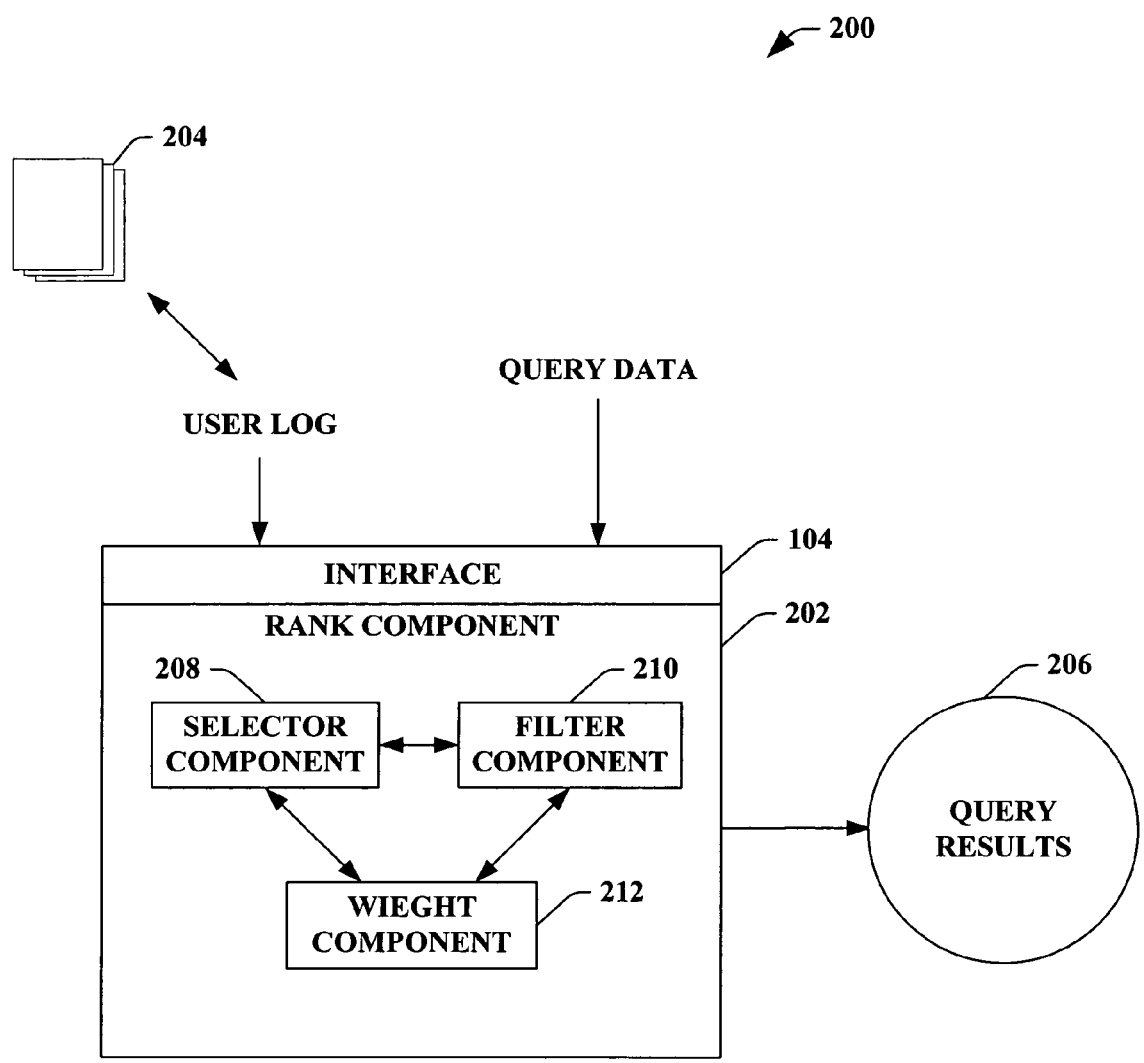
FIG. 2 illustrates a block diagram of an exemplary system that facilitates utilizing transition probability in static rankings associated with at least one document.

FIG. 2 illustrates a system 200 that facilitates utilizing transition probability in static rankings associated with at least one web page. The system 200 can include a rank component 202 that prioritizes query results (e.g., related to received query data), wherein the prioritizing implements transition probability based upon user activity and/or behavior. A user log can identify user activity and/or behavior allowing the rank component 202 to hierarchically sort query results in connection with transition probability for a document for a particular user. For instance, the user activity can be related to a document such as, but is not limited to, a hypertext markup language (HTML) document, a web page, a link, a hyperlink, a uniform resource locator (URL), a resource on the WWW, etc. Furthermore, the user behavior and/or activity can be, but is not limited to, an amount of time on a document (e.g., a user is on document A for X minutes), a log on to a document (e.g., a log on signifies a document of interest to a user), a log off to a document (e.g., a log off signifies the document contained information located therewith and no further document is of value), a document exited (e.g., indicating the information is located on such document and no further document is of value), a document request URI, a document referrer, etc. It is to be appreciated that the rank component 202 and the query results 206 can be substantially similar to the rank component 102 and the query results 106 depicted in FIG. 1.

The user log can be any suitable user log that includes identifying data related to user activity and/or behavior. For example, an IIS user log can be utilized by the rank component 202 to implement user behavior and/or activity to prioritize query results 206. In general, the user log can include data associated with at least one document 204. The documents 204 can be a set of web pages visited by a particular user having a respective user log. For example, a user can utilize a search engine (not shown) to visit various documents such as, but not limited to, documents 204, resources on the Internet, web pages, etc. In a particular example, the documents 204 can be web pages visited by a user within a certain time span. In general, the user log includes data associated with the visited documents 204, wherein such data can be utilized to identify user activity and/or behavior by the rank component 202.

The rank component 202 can include a selector component 208 that can analyze available data within the user log to identify relevant and/or optimal data to utilize to prioritize query results 206. The selector component 208 can select between the various amounts of data associated with the user log to optimally correlate with user activity and/or behavior. In other words, the selector component 208 can choose the best data and/or the best collection of data within the user log to identify user activity and/or behavior, wherein such behavior and/or activity is employed with transition probability to prioritize query results. For instance, a user A can have a user log that includes a plurality of data associated with logging in a document, while having little or no data associated with a document referrer. In the above instance, the selector component 208 can analyze such details to conclude the implementation of logging in data within the user log to identify user behavior and/or activity. Although the selector component 208 is incorporated into the rank component 202, it is to be appreciated that the selector component 208 can be a stand-alone component, incorporated into the rank component 202, and/or any combination thereof.

The rank component 202 can further include a filter component 210 that can sift data based at least in part upon the selected data identified by the selector component 208. The filter component 210 can reduce the amount of data within the user log to the selected data to identify a user activity and/or behavior. For example, the filter component 210 can utilize a hash technique, a sort technique, etc. Following the above example with the selector component 208 selecting logging in data as the optimal data to infer user activity and/or behavior for user A, the filter component 210 can sift the user log to have the logging in data. In addition, the filter component 210 can group the data to provide aggregate counts related to the documents. Furthermore, the filter component 210 can be a stand-alone component, incorporated into the rank component 202, and/or any combination thereof.

A weight component 212 can also be included in the system 200. The weight component 212 can provide weight and/or prioritize query results based at least in part upon transition probability related to a particular user activity and/or behavior. The weight component 212 can utilize a user rank technique to incorporate the transition probability related to a document based upon a user activity and/or behavior. For example, the weight component 212 can utilize a weighted graph with a matrix representation, wherein the matrix can represent the probability of moving from a document to a disparate document. It is to be appreciated that the weight component 212 can be a stand-alone component, incorporated into the rank component 202 (as depicted), and/or a combination thereof.

Figure 3:
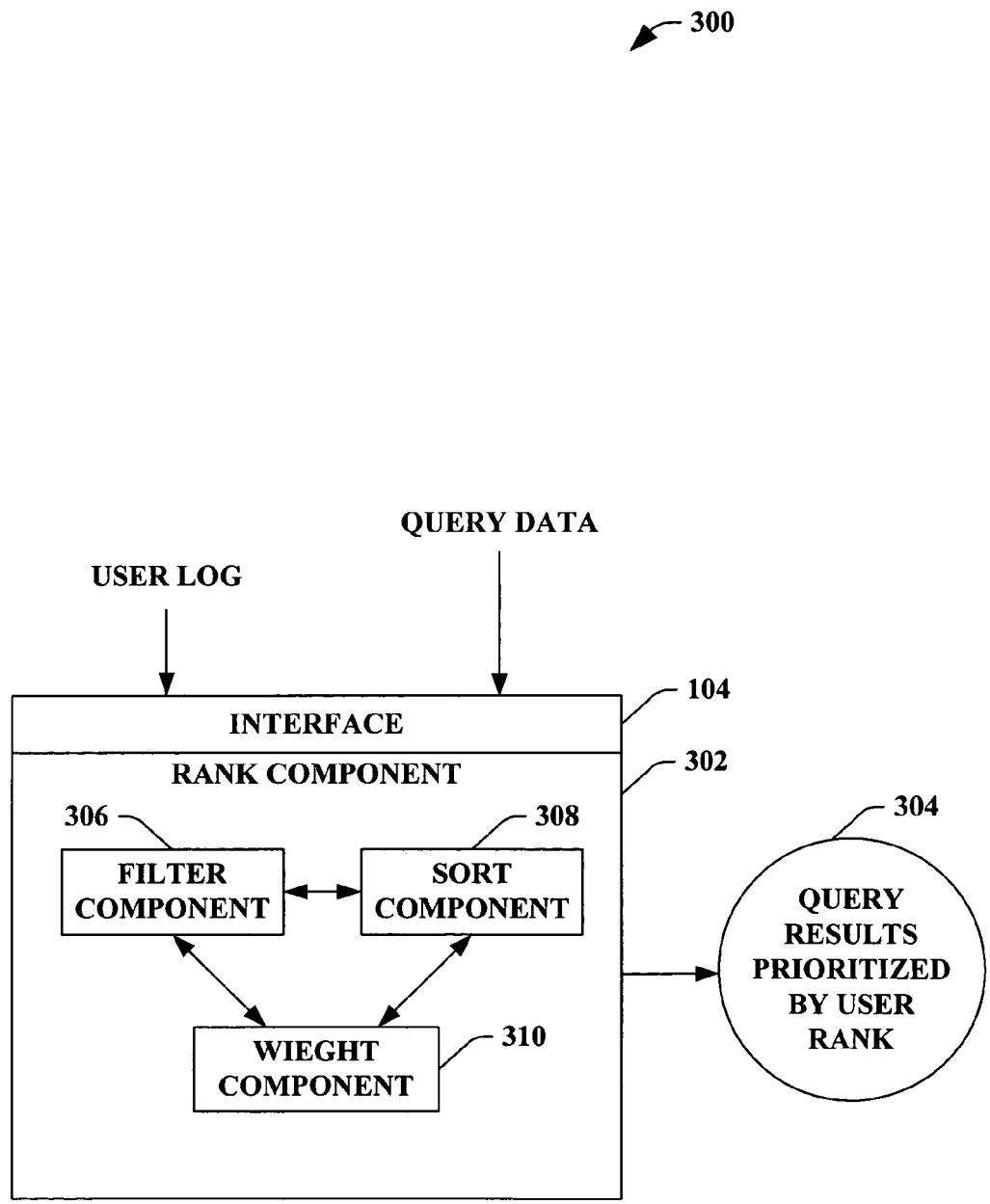
FIG. 3 illustrates a block diagram of an exemplary system that facilitates providing query results utilizing transition probability based upon user activity within a user log.

FIG. 3 illustrates a system 300 that facilitates providing query results utilizing transition probability based upon user activity within a user log. The system 300 can include a rank component 302 that provides prioritized query results 304 by utilizing a user rank technique. The rank component 302 implements transition probability associated with a user activity and/or behavior based at least in part upon a user log. By receiving the user log and query data via the interface 104, the rank component 302 can identify user activity and/or behavior in which to allow the prioritization of query results in connection with transition probability between at least two documents. It is to be appreciated that the rank component 302, user log, query data, and query results 304 can be substantially similar to the rank component 202 and 102, the user log, query data, and query results 204 and 104, depicted in FIGS. 2 and 1 respectively.

The rank component 302 can utilize a Markov chain to provide a user rank (e.g., the ranking of query results 304 implementing the transition probability). The Markov chain can be a probabilistic finite state machine and can be used to provide the answer to, for instance, the following: "Given a particular user in document X, where and with what probability will the user be after N clicks?" The rank component 302 can build a Markov chain by training on a sequence of transitions that occurred in real time. For example, a user was on document A and then moved to document B afterwards by following link X to Y. The rank component 302 can train the Markov model by utilizing user logs since the user logs store at least the document that was requested but the referring document (e.g., denoting a transition). The rank component 302 can employ a matrix representation for the Markov chain based at least in part upon the chain can be a weighted graph. The following matrix equation can represent the Markov model:

$$M = \begin{pmatrix} M_{11} & M_{12} & M_{13} \\ M_{21} & M_{22} & M_{23} \\ M_{31} & M_{32} & M_{33} \end{pmatrix}, \quad \text{Equation 1}$$

where $$\sum_y M_{iy} = 1$$

$M_{ij}$ can represent the probability of moving from document i to documents. For instance, a web based graph can have a sparse (e.g., $M_{ij}=0$) matrix, and hence may not be efficient to store the entire matrix. In one example, the non-empty items within the matrix can be stored.

The rank component can receive the user log in order to identify user activity and/or behavior associated with documents. In one example, the Markov chain can be generated by mining such user log for behavior contained in IIS logs. The rank component 302 can include a filter component 306 that filters data within the log such that relevant data can be utilized. In particular, the IIS log can be filtered by the filter component 306 such that data related to a document request URI and a document referrer is available. The following data table can be an example of the user log after the filter component 306 has filtered the data:

TABLE 1

| Referrer | Uri |
|---|---|
| A | B |
| B | C |
| A | C |
| A | B |
| C | D |
| B | D |
| A | C |
| A | B |
| B | D |
| C | D |
| A | B |
| B | A |
| D | B |
| D | C |

It is to be appreciated that the following examples can utilize the data illustrated in the data table above and the subject innovation is not so limited to such example.

A sort component 308 can also be utilized by the rank component 302 to group the data to provide aggregate counts as illustrated by Table 2 below:

TABLE 2

| Referrer | Uri | Count |
|---|---|---|
| A | B | 4 |
| A | C | 2 |
| B | A | 1 |
| B | C | 1 |
| B | D | 2 |
| C | D | 2 |
| D | B | 1 |
| D | C | 1 |

The sort component 308 can implement any suitable technique such as, but not limited to, hashing, sorting, etc.

Figure 4:
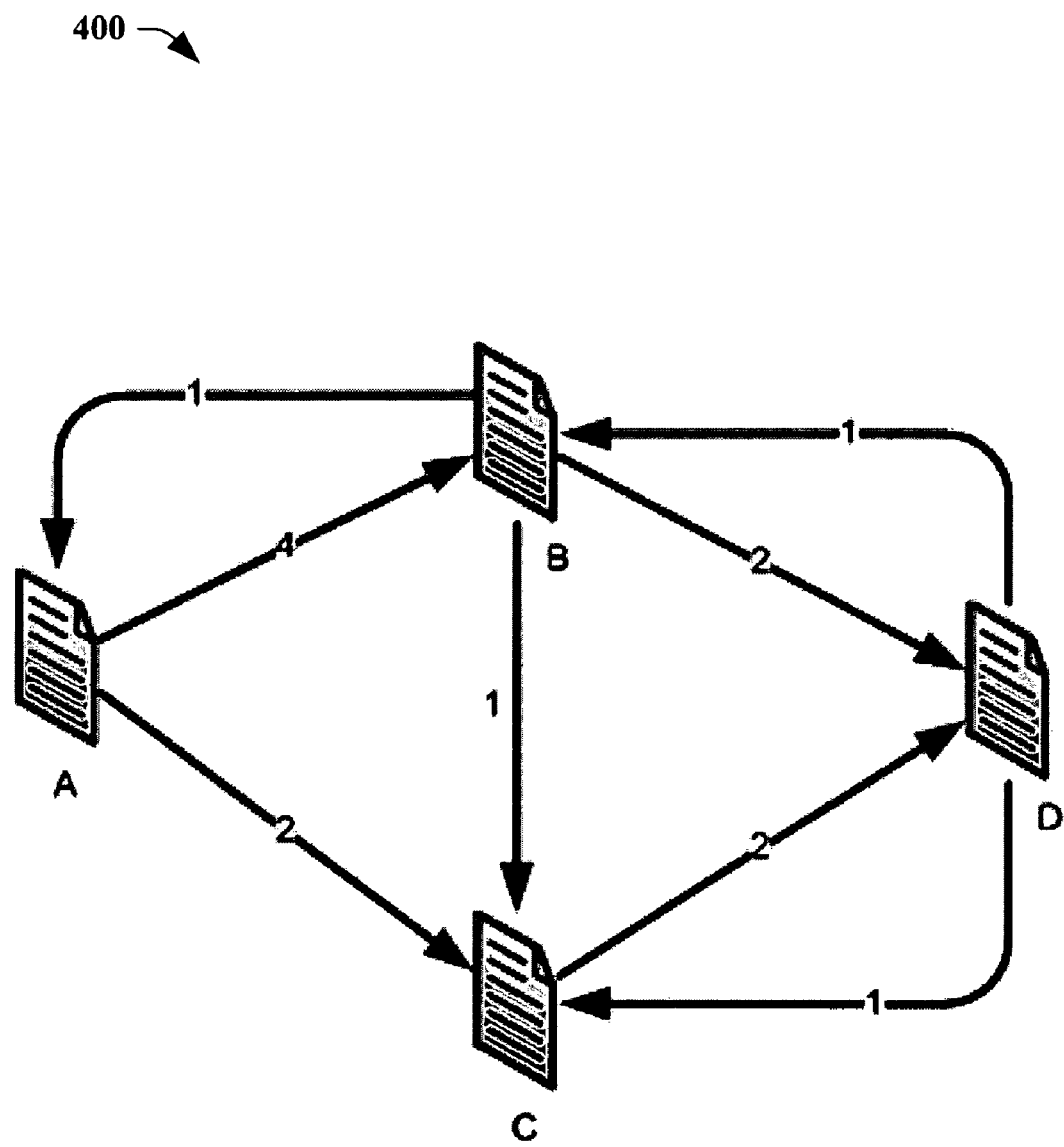
FIG. 4 illustrates a transition graph resulting from a user log in accordance with the claimed subject matter.

By utilizing the sort component 308, the aggregated counts can be utilized to create a transition graph 400 as illustrated in FIG. 4. FIG. 4 illustrates a transition graph 400 resulting from a user log in accordance with the claimed subject matter. The transition graph 400 can be based upon the data illustrated in Tables 1 and 2, but it is to be appreciated that the implementation of such data is not to be limiting on the claimed subject matter. The transition graph 400 illustrates results from utilizing data from the user log. For instance, a user log illustrates a total of four transitions from document A to document B (e.g., as tallied up in Table 1 and depicted in transition graph 400).

A weight component 310 can be associated with the rank component 302 to provide prioritized results based on transition probability of a particular user. The weight component 310 can compute the probability a user journeys to a certain document given the current document such user is on by building a Markov chain.

The weight component 310 can create the Markov chain by dividing each of the weights of the outgoing edges by the sum of outgoing edges of that vertex. Such results by division can be illustrated by Table 3, illustrated below:

TABLE 3

| Referrer | Uri | Probability |
|---|---|---|
| A | B | 0.66 |
| A | C | 0.33 |
| B | A | 0.25 |
| B | C | 0.25 |
| B | D | 0.5 |
| C | D | 1 |
| D | B | 0.5 |
| D | C | 0.5 |

The weight component 310 can normalize to get probabilities by implementing the following equation:

$$M_{ij} = \frac{M_{ij}}{\sum_y M_{iy}} \quad \text{Equation 2}$$

Figure 5:
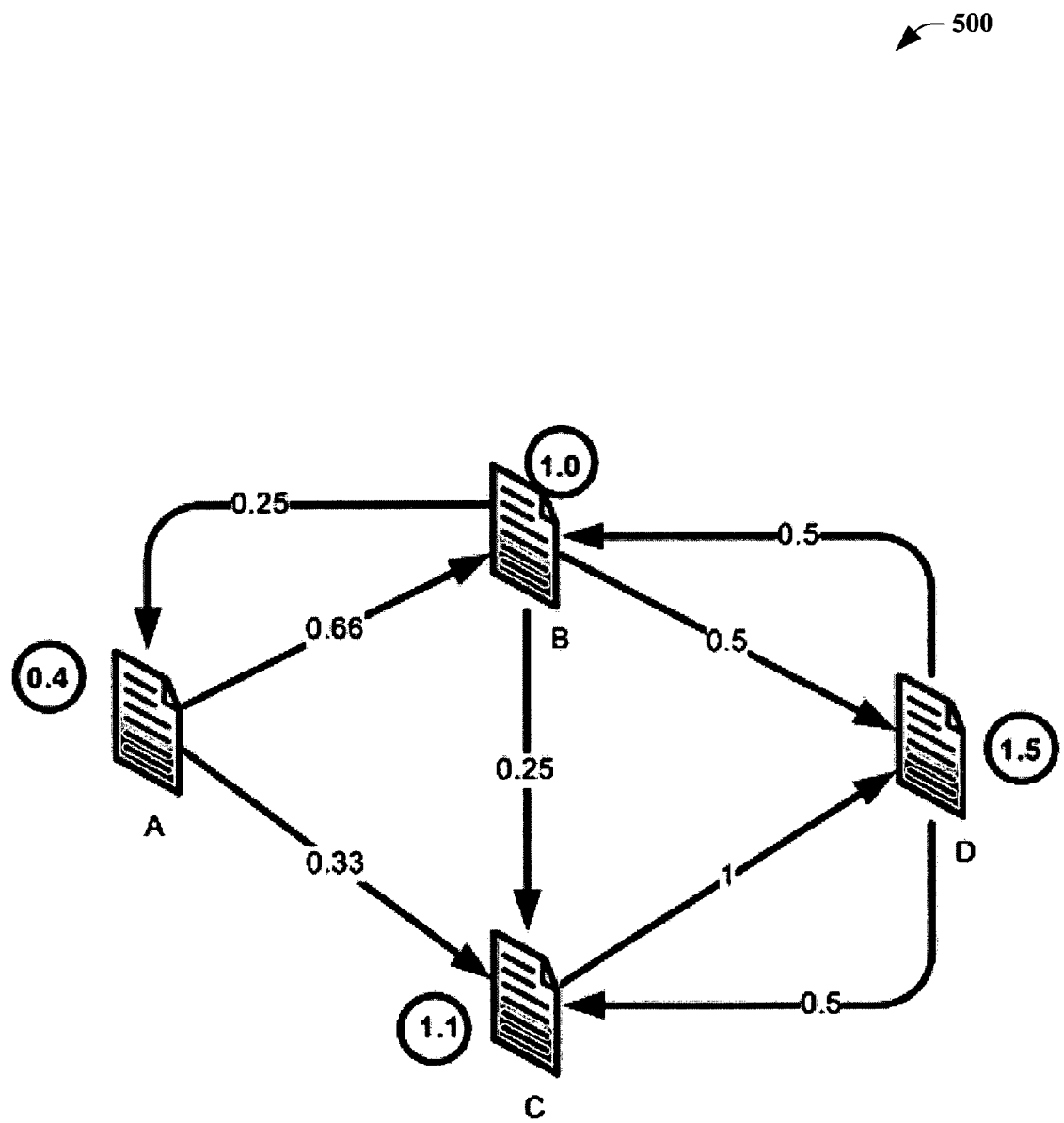
FIG. 5 illustrates a resulting Markov Chain in accordance with the subject innovation.

The probability a user visits a certain document given a current document can be implemented by utilizing a Markov chain 500 illustrated in FIG. 5. FIG. 5 illustrates a resulting Markov Chain 500 in accordance with the subject innovation. Thus, continuing with the above examples and data, a user on document A has a 0.66 probability of transitioning to document B. Again, it is to be appreciated that the data illustrated in Tables 1, 2 and 3 are to be seen as examples and not to be limiting on the claimed subject matter. FIG. 5 further depicts the actual UserRank of each node designated by the value within the circle.

Furthermore, the weight component 310 can calculate a user rank from the created Markov model. The user rank of a document can be recursively defined by the user rank of the documents users have followed to find the document. For example, the equation below can be utilized to calculate the user rank, wherein user rank can be seen as the importance of a document. The d in the equation is the called the damping factor which can be thought of the probability that the user gets bored and randomly jumps from their current page to any other page rather than following a link on the current page. This can be thought of as an invisible link from every page to every other page. For our examples we set d=0.15.

$$UserRank(X) = \quad \text{Equation 3}$$
$$(1-d) + d\sum_P^X Pr(\text{going to } X \text{ from } P) * UserRank(P)$$

By utilizing the above, the following examples can be calculated:

UserRank(A)=0.15+(0.85)(0.25)*UserRank(B);

UserRank(B)=0.15+(0.85)[(0.66)*UserRank(B)+(0.5)*UserRank(D)];

UserRank(C)=0.15+(0.85)[(0.33)*UserRank(A)+(0.25)*UserRank(B)+(0.5)*UserRank(D)]; and UserRank(D)=0.15+(0.85)[(0.5)*UserRank(B)+UserRank(D)].

One can appreciate that although node C has the most incoming links, node D gets a higher UserRank because users are more likely to travel towards it. Since the UserRank of A is so low, it means that users did not find it very useful; they tend to navigate away from it more than navigate towards it.

Figure 6:
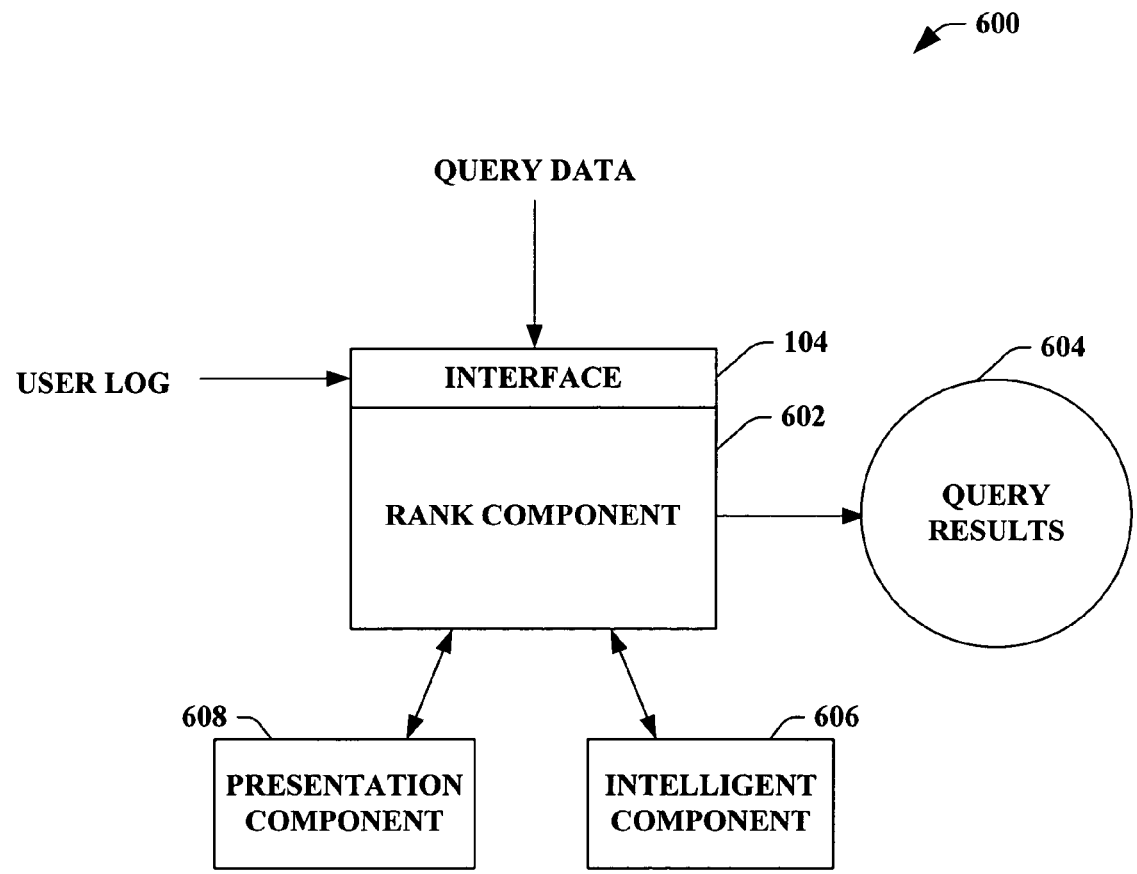
FIG. 6 illustrates a block diagram of an exemplary system that facilitates providing query results based at least in part upon user activity.

FIG. 6 illustrates a system 600 that employs intelligence to facilitate providing query results 604 based at least in part upon user activity, wherein the query results 604 are prioritized according to a transition probability related to documents. The system 600 can include a rank component 602, a user log, query data, and the interface 104 that can all be substantially similar to respective components, logs, data, and interfaces described in previous figures. The system 600 further includes an intelligent component 606. The intelligent component 606 can be utilized by the rank component 602 to facilitate prioritizing query results 604 based upon user activity and/or behavior. For example, the intelligent component 606 can infer the user behavior, user activity, data selection in relation to the user log, configuration settings for a particular user in accordance to user log data, etc.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The system 600 can further utilize a presentation component 608 that provides various types of user interfaces to facilitate interaction between a user and any component coupled to the rank component 602. As depicted, the presentation component 608 is a separate entity that can be utilized with the rank component 602. However, it is to be appreciated that the presentation component 608 and/or similar view components can be incorporated into the rank component 602 and/or a stand-alone unit. The presentation component 608 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the rank component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
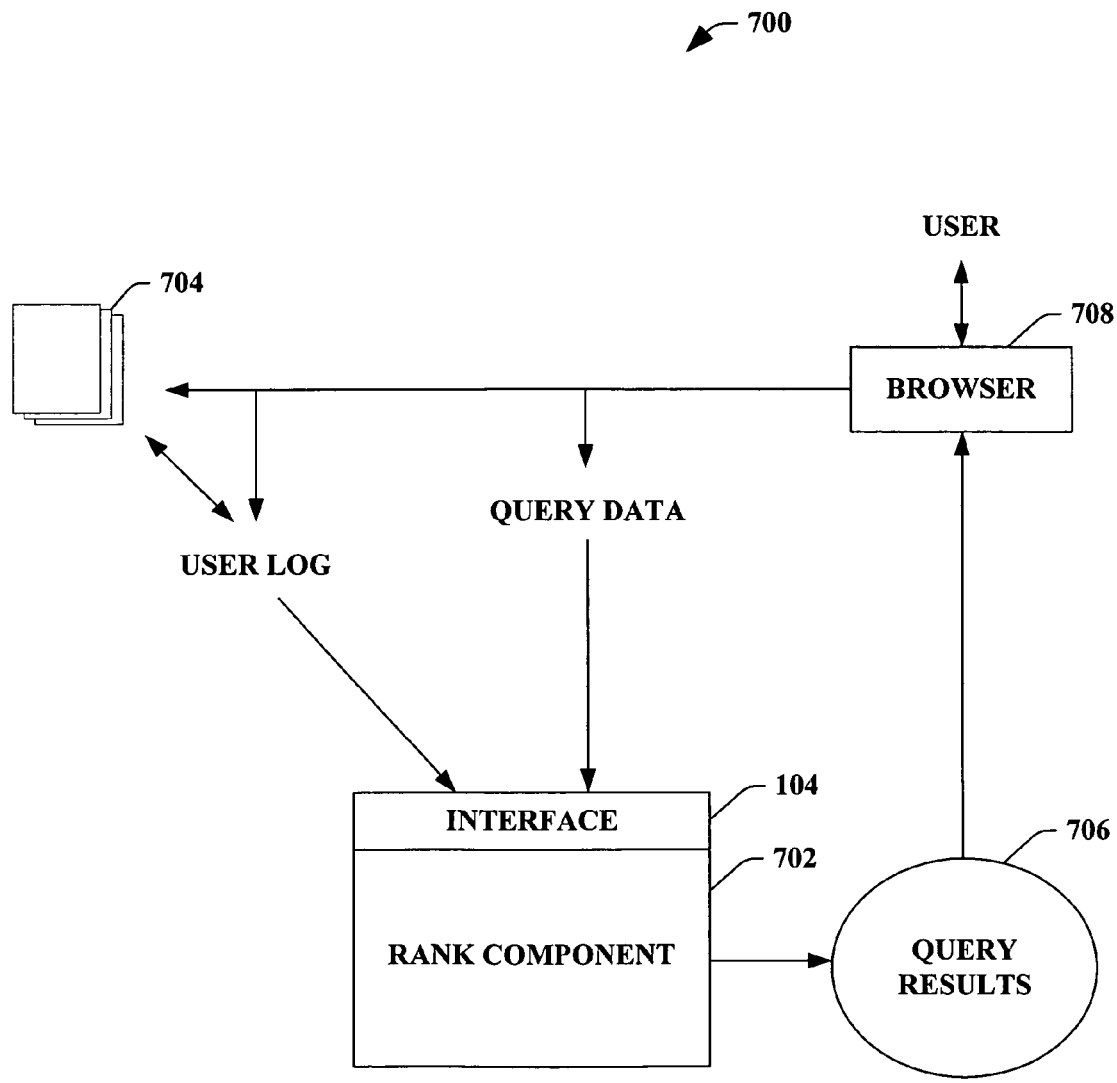
FIG. 7 illustrates a block diagram of an exemplary system that facilitates providing query results utilizing transition probability based upon user activity within a user log.

FIG. 7 illustrates a system 700 that facilitates providing query results utilizing transition probability based upon user activity within a user log. The system 700 can utilize a rank component 702 that prioritizes query results 706 based at least in part upon user activity in relation to a document 704. The documents 704 can be, for instance, a hypertext markup language (HTML) document, a web page, a link, a hyperlink, a uniform resource locator (URL), a resource on the WWW, etc. A user log can provide data related to the activity and/or behavior associated with a particular user. In one example, the user log can be configured specific to each user to facilitate identifying user activity and/or behavior. The interface 104 can provide receipt of data including, but not limited to, user logs, query data, etc. By identifying user activity and/or behavior from the user log, the rank component 702 can prioritize query results (e.g., related to the query data) based upon transition probability between documents according to the user activity and/or behavior.

Furthermore, a user can utilize a browser 708 to access and/or visit at least one document 704. The browser 708 can further provide manipulation to the user log providing updates related to the documents accessed and/or visited. For instance, the user can utilize a browser 708 to access a particular document. In another example, the browser 708 can allow a query to be performed in relation to the Internet. Such browser 708 can provide the query data to the rank component 702, wherein the rank component 702 can provide prioritized query results 706 in relation to transition probability to the browser 708. Thus, by utilizing the user log, the user activity and/or behavior can be utilized to identify transition probability in relation to prioritizing query results in connection with documents 704.

Figure 8:
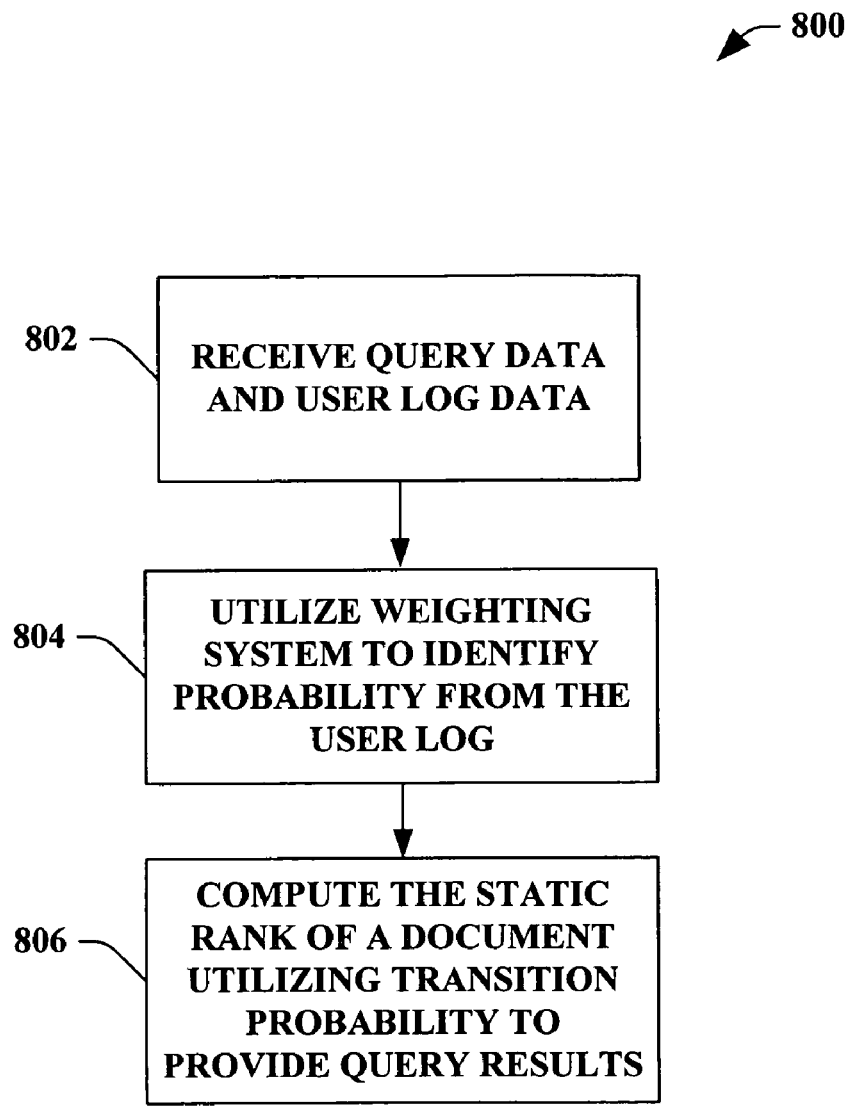
FIG. 8 illustrates an exemplary methodology for providing query results based at least in part upon user activity.
Figure 9:
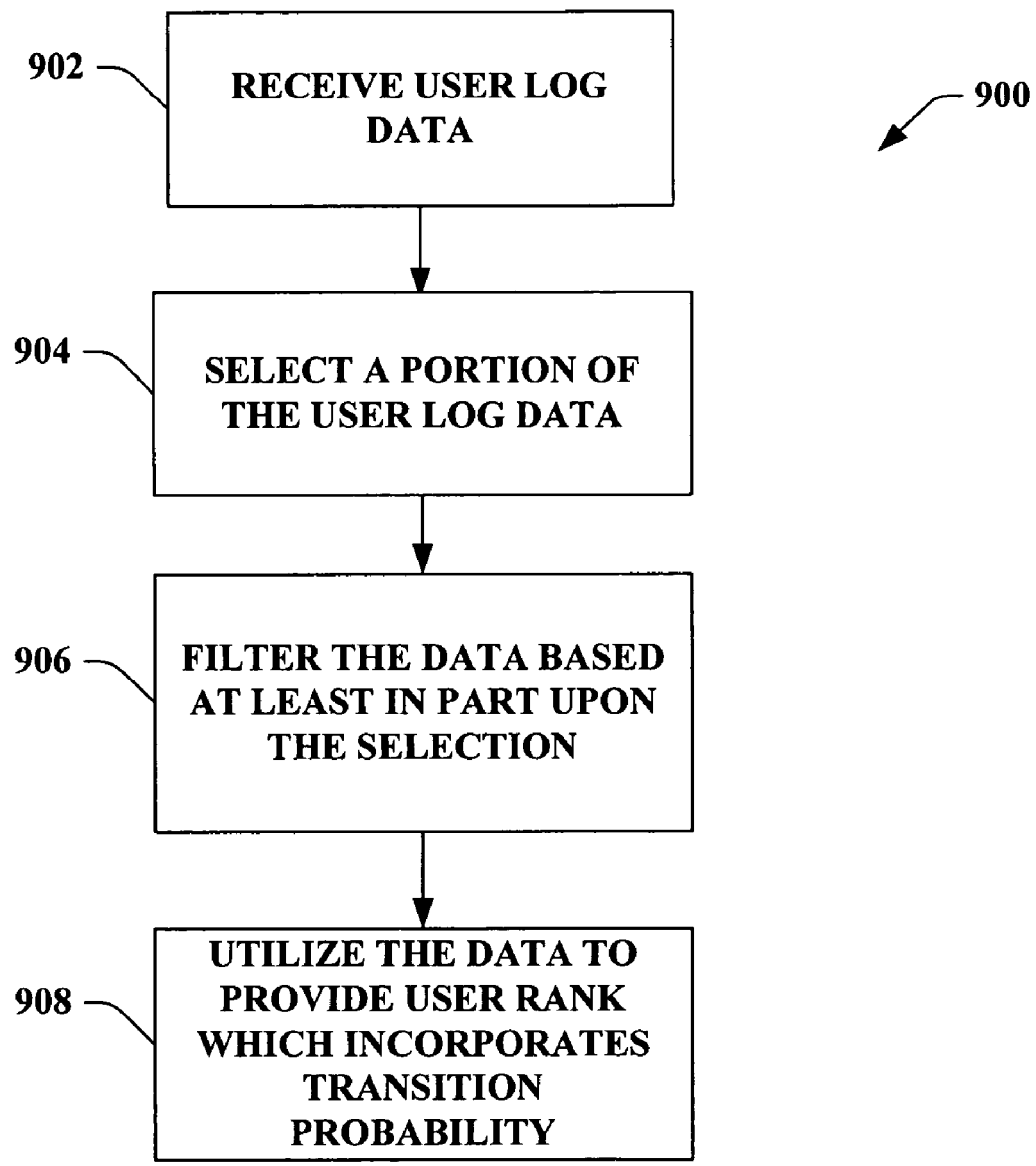
FIG. 9 illustrates an exemplary methodology that facilitates providing query results utilizing transition probability based upon user activity within a user log.
Figure 10:
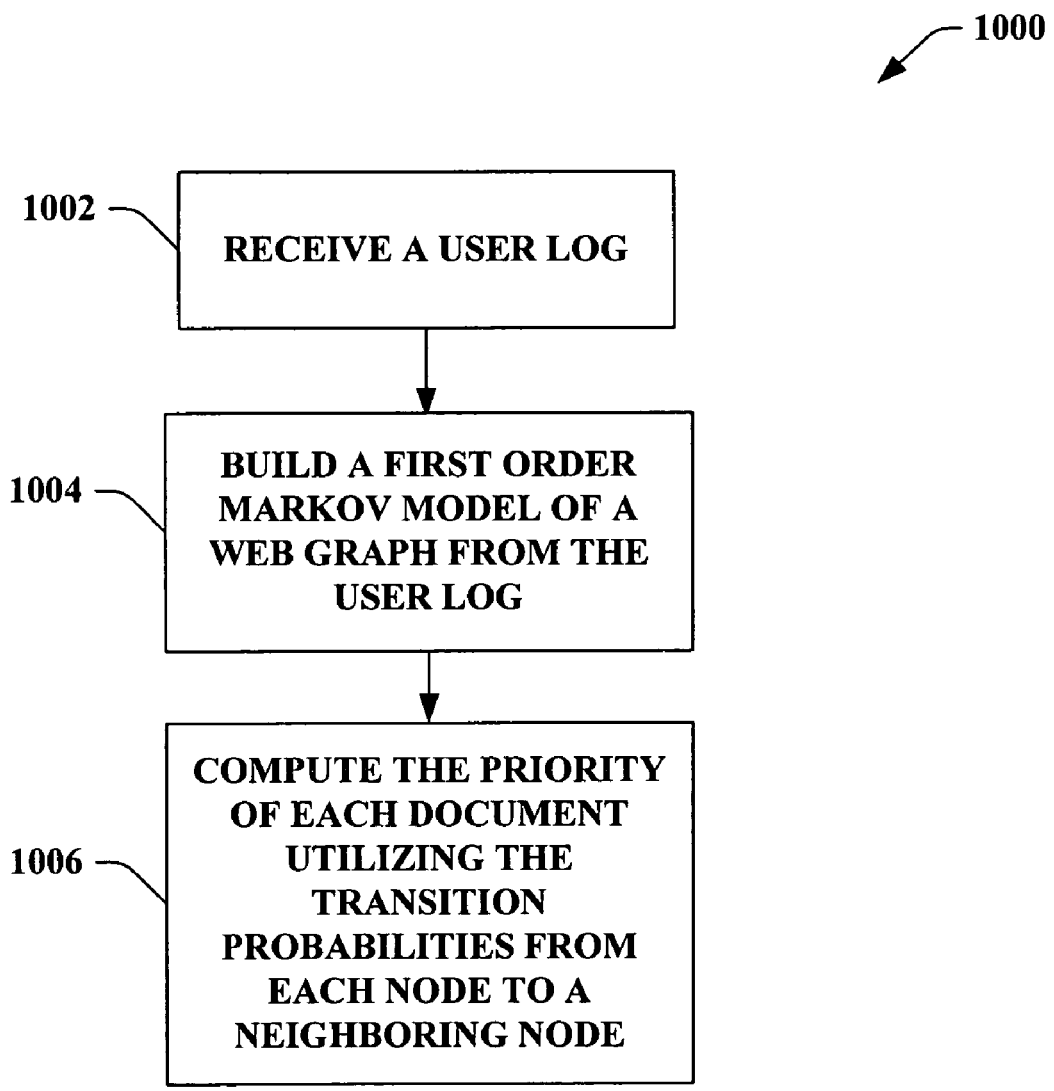
FIG. 10 illustrates an exemplary methodology for utilizing transition probability in static rankings associated with at least one document.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates providing query results based at least in part upon user activity. At reference numeral 802, query data and a user log can be received. The query data can relate to a query for at least one document. The document can be, but is not limited to, a hypertext markup language (HTML) document, a web page, a link, a hyperlink, a uniform resource locator (URL), a resource on the WWW. The user log can be any suitable user log that allows a user activity and/or behavior to be identified. For instance, the user log can be an IIS user log. In particular, the user behavior and/or activity can be, but is not limited to, an amount of time on a document (e.g., a user is on document A for X minutes), a log on to a document (e.g., a log on signifies a document of interest to a user), a log off to a document (e.g., a log off signifies the document contained information located therewith and no further document is of value), a document exited (e.g., indicating the information is located on such document and no further document is of value), a document request URI, a document referrer, etc.

At reference numeral 804, a weighting system can be utilized to identify the probability from the user log. For instance, a first order Markov model can be generated from a web graph from the user log. By utilizing such weighting system, the transition probability associated with documents can be taken in account in relation to a user activity and/or behavior. At reference 806, the static rank of a document can be computed utilizing the transition probability to provide query results. For instance, the user behavior can be identified from the user log, wherein such data can be utilized to build a transition graph (e.g., grouping data to aggregate counts by utilizing hashing and/or sorting). Each of the weights of the outgoing edges can be divided by the sum of all the outgoing edges of that vertex. In other words, the probabilities can be obtained by normalizing. The user rank of a page is then recursively defined by the user rank of the documents users have following to find the document. Upon determining the user rank, the query results can be prioritized based at least in part upon the ranking.

FIG. 9 illustrates a methodology 900 for providing query results utilizing transition probability based upon user activity within a user log. At reference numeral 902, data related to a user log can be received. The user log can be any suitable user log that allows a user activity and/or behavior to be identified in relation to at least one document. The document can be, but is not limited to, a hypertext markup language (HTML) document, a web page, a link, a hyperlink, a uniform resource locator (URL), a resource on the WWW.

At reference numeral 904, at least a portion of the data within the user log can be selected. For instance, an inference can be made to identify the optimal data to be utilized from the user log in order to achieve accurate user activity and/or behavior to provide transition probability-based prioritized query results. For example, the document request URI and the document referrer can be selected from the user log, wherein such information illustrates a prior document and a new document accessed. At reference numeral 906, the data can be filtered based at least in part upon the selection. In one example, the data can be filtered by employing a hash technique and/or a sort technique. At reference numeral 908, the sorted data can be utilized to provide user ranked query results, wherein such user rank incorporates transition probability in relation to documents in accordance to the user activity and/or behavior. For instance, the user rank can utilize a weight system such as, but not limited to a Markov model, wherein such model utilizes transition probability in connection with user activity and/or behavior (e.g., from data within the user log) associated with documents.

FIG. 10 illustrates a methodology that facilitates utilizing transition probability in static rankings associated with at least one web page. At reference numeral 1002, a user log can be received. The user log can include data that allows a user activity and/or behavior to be identified. At reference numeral 1004, a first order Markov model of a web graph can be created from the data within the user log. For example, the Markov model can be represented by a matrix as follows:

$$M = \begin{pmatrix} M_{11} & M_{12} & M_{13} \\ M_{21} & M_{22} & M_{23} \\ M_{31} & M_{32} & M_{33} \end{pmatrix},$$

where $$\sum_y M_{iy} = 1.$$

In addition, $M_{ij}$ can represent the probability of moving from document i to document j. The probability can be normalized by utilizing the following:

$$M_{ij} = \frac{M_{ij}}{\sum_y M_{iy}}.$$

Furthermore, the priority of a document can be recursively defined by a user rank of the documents users have followed to find the document by implementing the following:

$$UserRank(X) = (1-d) + d \sum_P^X Pr(\text{going to } X \text{ from } P) * UserRank(P)$$

Figure 11:
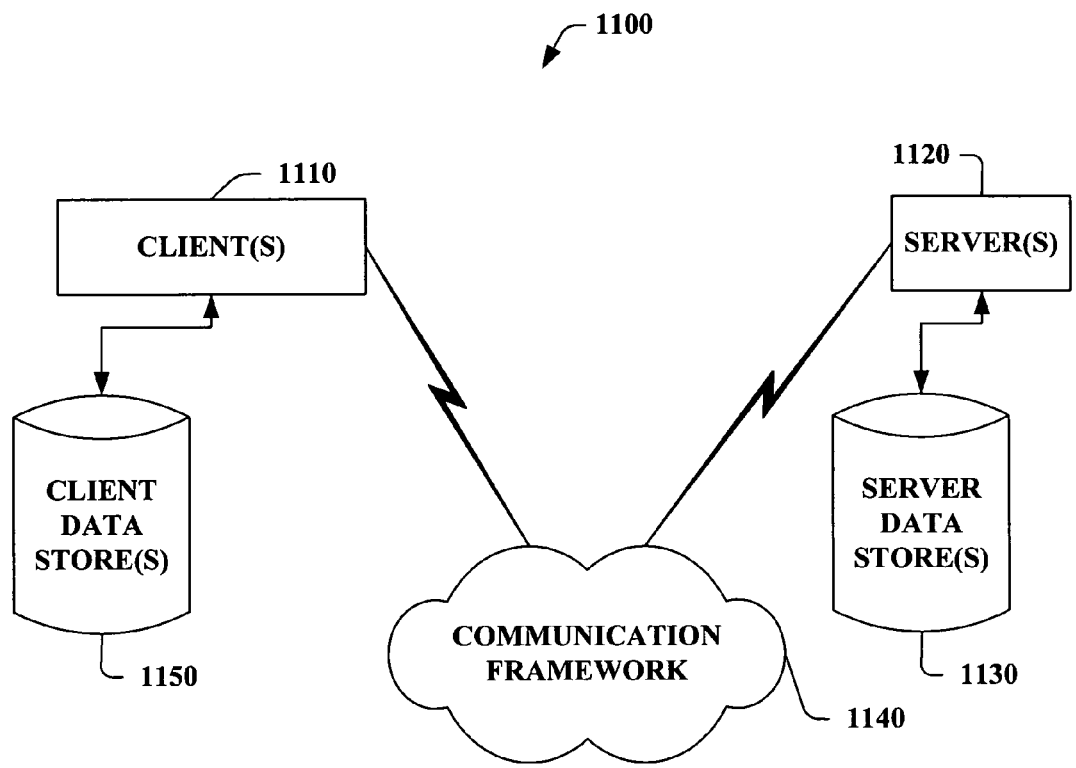
FIG. 11 illustrates an exemplary networking environment, wherein the novel aspects of the claimed subject matter can be employed.
Figure 12:
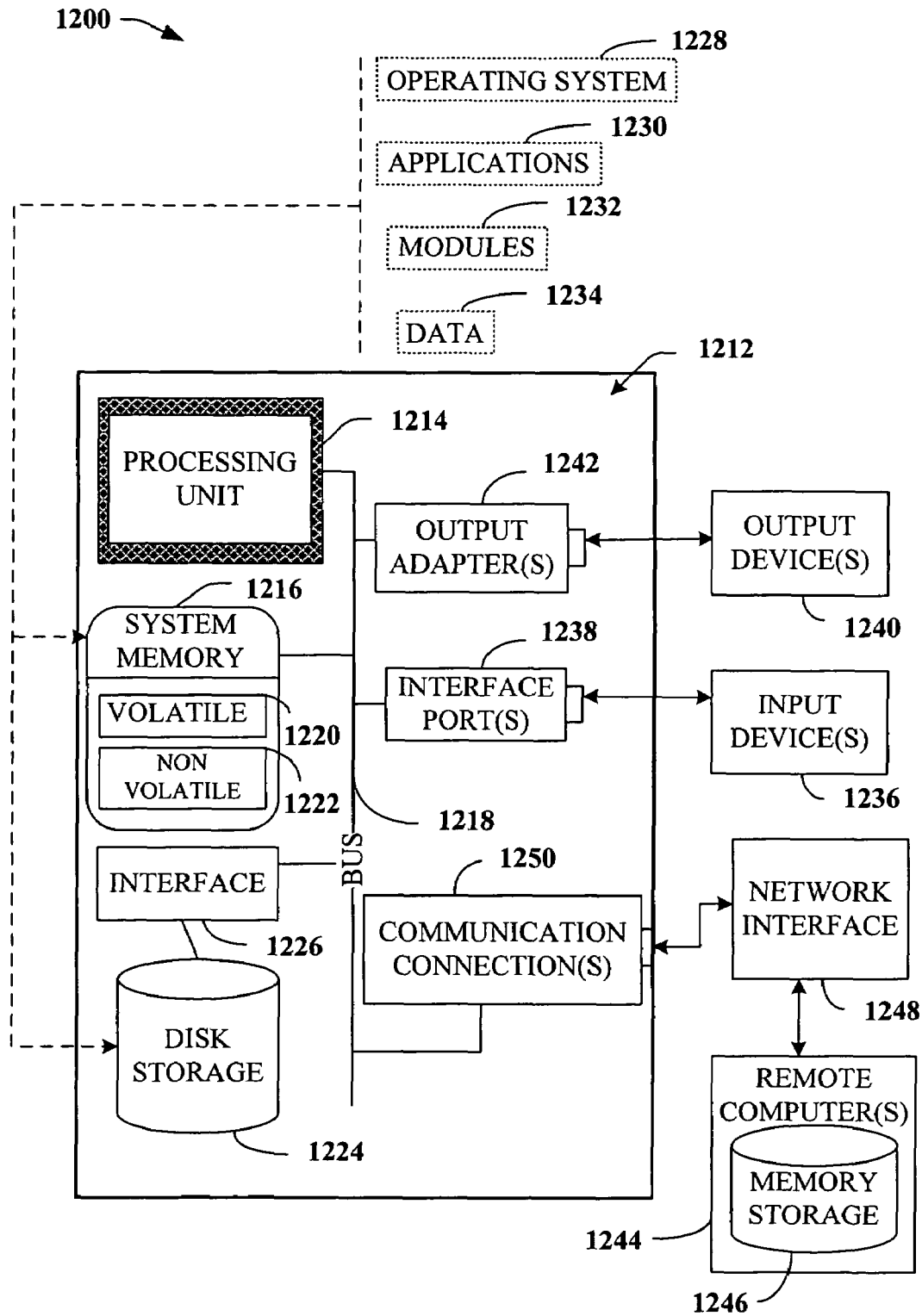
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a rank component that prioritizes query results utilizing transition probability based upon user activity in connection with documents, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates providing query results to a user, comprising:

a processor;

system memory;

an interface that receives data related to a query associated with a specific user;

a user log component that comprises at least a repository of historic activities, behaviors, or combinations thereof specific to a user, wherein the logged historic user activities and/or behaviors are related to prospective interactions with objects related to the query results;

a rank component that provides ranked query results adapted in relation to a specific user log, wherein the query results are at least in part prioritized utilizing a transition probability determination related to the specific user for user transitions between objects related to prospective query results based on historical user activity, user behavior, or combinations thereof, wherein the transition probability determination comprises utilizing a weighting technique that implements the following representation of a Markov model:

$$M = \begin{pmatrix} M_{11} & M_{12} & M_{13} \\ M_{21} & M_{22} & M_{23} \\ M_{31} & M_{32} & M_{33} \end{pmatrix}, \quad \text{Equation 1}$$

where $$\sum_y M_{iy} = 1$$

and wherein the weighting technique uses the following to normalize aggregated counts related to the document to identify a probability:

$$M_{ij} = \frac{M_{ij}}{\sum_y M_{iy}},$$

where i is a first document and j is a disparate document, and $M_{ij}$ represents the probability of transitioning from document i to document j, and wherein the weighting technique uses the following to calculate a user rank of a document, wherein the user rank is recursively defined by the user rank of documents and user has followed to locate the document:

UserRank(X)=(1−d)+d $\Sigma^X_P$ PR(P→X)(UserRank(P)), where d is a damping factor and P→X is going to X from P; and a results providing component configured to provide prioritized query results that incorporate transition probability related to a document.

2. The system of claim 1, the transition probability determination is related to the specific user for user transitions between documents related to prospective query results based on historical user activity, user behavior, or combinations thereof.

3. The system of claim 2, the document is at least one of the following: a hypertext markup language (HTML) document; a web page; a link; a hyperlink; a uniform resource locator (URL); and a resource on the World Wide Web.

4. The system of claim 1, the user activity is at least one of the following: a document request; a document referrer; and a document request uniform resource identifier (URI).

5. The system of claim 1, the user activity is at least one of time on and object, entering an object, exiting an object, logging into an object, logging out of an object, linking to a disparate object from an object, a log off associated with a web page, or combinations thereof.

6. The system of claim 1, further comprising a selector component that analyzes available data within the user log to identify optimal data to indicate user activity.

7. The system of claim 6, further comprising a filter component that sifts data based at least in part upon the optimal data identified.

8. The system of claim 7, the filter component utilizes at least one of a hash technique and a sort technique to group the data to provide aggregate counts related to the object.

9. The system of claim 1, further comprising a weight component that implements accruing weight to the query result based at least in part upon the transition probability.

10. The system of claim 9, the weight component utilizes a first order Markov chain that is trained on a sequence of transitions that occurred between at least two documents linked via a hyperlink.

11. The system of claim 1, further comprising a browser that allows a user to access at least one object and updates the user log with each access.

12. The system of claim 1, the user log is an Internet information server (IIS) user log.

13. A computer-implemented method that facilitates prioritizing query results, comprising:

receiving a user log including data related to historic user activities, behaviors, or combinations thereof for historic user interaction with documents, said documents being related to the prospective interaction with documents related to the query results;

utilizing a weighting technique to identify a transition probability related to the specific user for prospective interactions with document related to query results based at least in part on a user activity and/or behavior associated with the user log, wherein the weighting technique utilizes the following representation of a Markov model:

$$M = \begin{pmatrix} M_{11} & M_{12} & M_{13} \\ M_{21} & M_{22} & M_{23} \\ M_{31} & M_{32} & M_{33} \end{pmatrix}, \quad \text{Equation 1}$$

where $$\sum_y M_{iy} = 1$$

and wherein the weighting technique uses the following to normalize aggregated counts related to the document to identify a probability:

$$M_{ij} = \frac{M_{ij}}{\sum_y M_{iy}},$$

where i is a first document and j is a disparate document, and $M_{ij}$ represents the probability of transitioning from document i to document j, and wherein the weighting technique uses the following to calculate a user rank of a document, wherein the user rank is recursively defined by the user rank of documents a user has followed to locate the document:

$$UserRank(X) = (1-d) + d\sum_P^X \Pr(P \to X)(UserRank(P)),$$

where d is a damping factor and P→X is going to X from P; and providing prioritized query results that incorporate transition probability related to a document.

14. The method of claim 13, the weighting technique is a first order Markov model of a web graph from the user log.

15. The method of claim 13, the weighting technique computes a static rank of each document utilizing the transition probability form each node to a neighboring node.

16. A computer-implemented system that facilitates query results to a user, comprising:
   a processing means;
   a data storage means;
   means for receiving data related to a query;
   means for logging historical user data related to user actions, behaviors, or combinations thereof to facilitate probabilistic determinations for future user behaviors and/or actions related to the objects of the same or similar queries;
   means for utilizing a utilizing a weighting technique to identify a transition probability related to the specific user for prospective interactions with document related to query results based at least in part on a user activity and/or behavior associated with the user log, wherein the weighting technique utilizes the following representation of a Markov model:

$$M = \begin{pmatrix} M_{11} & M_{12} & M_{13} \\ M_{21} & M_{22} & M_{23} \\ M_{31} & M_{32} & M_{33} \end{pmatrix},$$ Equation 1 where $$\sum_y M_{iy} = 1$$

where $\Sigma_y M_{iy} = 1$,
and wherein the weighting technique uses the following to normalize aggregated counts related to the document to identify a probability:

$$M_{ij} = \frac{M_{ij}}{\sum_y M_{iy}},$$

where i is a first document and j is a disparate document, and $M_{ij}$ represents the probability of transitioning from document i to document j, and wherein the weighting technique uses the following to calculate a user rank of a document, wherein the user rank is recursively defined by the user rank of documents a user has followed to locate the document:

$$UserRank(X) = (1-d) + d\Sigma_P^X Pr(P \to X)(UserRank(P)),$$

where d is a damping factor and P→X is going to X from P; and means for providing query results that are prioritized utilizing a transition probability based on user activity included within a user log.

* * * * *